(12) United States Patent
Nagata

(10) Patent No.: US 8,854,501 B2  
(45) Date of Patent: Oct. 7, 2014

(54) IMAGE PROCESSING APPARATUS AND IMAGE PROCESSING METHOD FOR PROCESSING SPECTRAL IMAGE DATA

(75) Inventor: Toru Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 12/548,257

(22) Filed: Aug. 26, 2009

(65) Prior Publication Data

US 2010/0053375 A1    Mar. 4, 2010

(30) Foreign Application Priority Data

Aug. 29, 2008   (JP) ................ 2008-222461

(51) Int. Cl.
- H04N 9/68      (2006.01)
- H04N 9/04      (2006.01)
- G06T 7/00      (2006.01)
- H04N 5/232     (2006.01)

(52) U.S. Cl.
CPC .............. H04N 9/045 (2013.01); G06T 7/0081 (2013.01); H04N 5/23229 (2013.01)
USPC ........................ 348/234; 348/229.1

(58) Field of Classification Search
CPC ................................. H04N 5/23229
USPC ............................. 348/229.1, 234
See application file for complete search history.

(56) References Cited

U.S. PATENT DOCUMENTS

| | | | |
|---|---|---|---|
| 2004/0165773 A1* | 8/2004 | Katsuyama | 382/173 |
| 2006/0078216 A1* | 4/2006 | Kaku | 382/254 |
| 2008/0259181 A1* | 10/2008 | Yamashita et al. | 348/229.1 |

FOREIGN PATENT DOCUMENTS

| | | |
|---|---|---|
| JP | 61-272875 A | 12/1986 |
| JP | 2005-39408 | 2/2005 |
| JP | 2005-039408 A | 2/2005 |
| JP | 2007278950 | 10/2007 |

* cited by examiner

*Primary Examiner* — Usman Khan  
(74) *Attorney, Agent, or Firm* — Canon USA, Inc. IP Division

(57) ABSTRACT

An image processing apparatus for processing spectral image data of an object includes a normalization unit configured to normalize spectral data in each pixel of the spectral image data with respect to luminance level, a deviation amount calculation unit configured to calculate a deviation amount between the spectral data of a reference pixel and the spectral data of a target pixel to be clustered, which are normalized by the normalization unit, among each of the pixels of the spectral image data, and a segment determination unit configured to determine an affiliated segment of target pixel in the object of the spectral image data based on the deviation amount calculated by the deviation amount calculation unit.

17 Claims, 7 Drawing Sheets

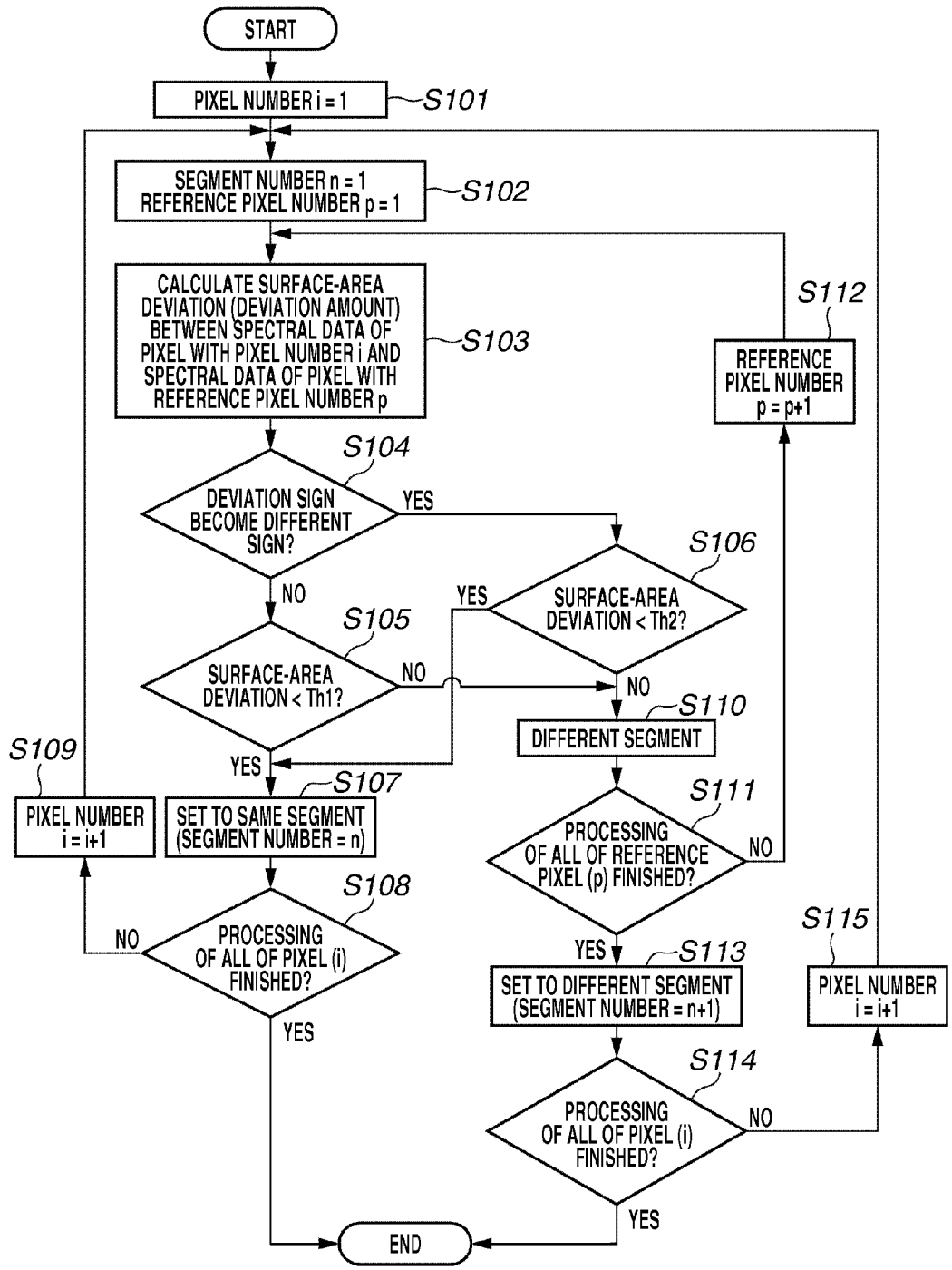

IMAGE PROCESSING APPARATUS AND IMAGE PROCESSING METHOD FOR PROCESSING SPECTRAL IMAGE DATA

BACKGROUND OF THE INVENTION

1. Field of the Invention

The present invention relates to an image processing apparatus and image processing method for processing spectral image data of an object.

2. Description of the Related Art

An object can be recorded as an image relating to a spectral distribution or spectral reflectance by, for example, using a multiband camera with multiple filters that have different transmission wavelength regions. The multiband camera captures the object by using light passing through the multiple filters as discussed in Japanese Patent Application Laid-Open No. 2007-278950.

Further, as an image clustering method of the object (object image) based on the spectral distribution or spectral, for example, Japanese Patent Application Laid-Open No. 2005-39408 discusses a image clustering method relating to a person's skin.

According to this method, image clustering can be performed accurately even when division is impossible because the colors are considered to be the same with three primary colors red (R), green (G), and blue (B), for example. Furthermore, if image clustering of the object is performed accurately, image processing such as color processing and noise processing can be performed in an optimal manner for each area.

However, for image clustering based on spectral data using conventionally-known methods, the target object must be uniformly illuminated by a single illumination light source.

For example, when bright and dark areas are formed on the object due to the three-dimensional shape of the target object, the distribution of the obtained spectral data is different between the sun-lit area and the shadow area on that object. Therefore, conventionally, even if the areas have identical spectral reflectance, it is difficult to recognize these areas as the areas having the same spectral data.

Further, when the object is illuminated by a plurality of illumination light sources having different spectral radiances, it is similarly difficult to recognize areas, which are illuminated by different illumination light sources, as the same areas.

SUMMARY OF THE INVENTION

The present invention is directed to an image processing apparatus and an image processing method, each of which allows areas having a constant spectral reflectance to be accurately segmented regardless of the state of an object when processing spectral image data of the object.

An image processing apparatus for processing spectral image data of an object includes a normalization unit configured to normalize spectral data in each pixel of the spectral image data with respect to luminance level, a deviation amount calculation unit configured to calculate a deviation amount between the spectral data of a reference pixel and the spectral data of a target pixel to be clustered, which are normalized by the normalization unit, among each of the pixels of the spectral image data, and a segment determination unit configured to determine an affiliated segment of target pixel in the object of the spectral image data based on the deviation amount calculated by the deviation amount calculation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an example of operations performed by an image clustering unit illustrated in FIG. 1.

DETAILED DESCRIPTION OF THE EMBODIMENTS

Various exemplary embodiments, features, and aspects of the invention will be described in detail below with reference to the drawings.

The image processing apparatus according to the present invention may be suitably embodied as a software program that is embedded in a digital camera or a digital video camera, or in a computer into which image data output by such cameras is input.

Figure 1:
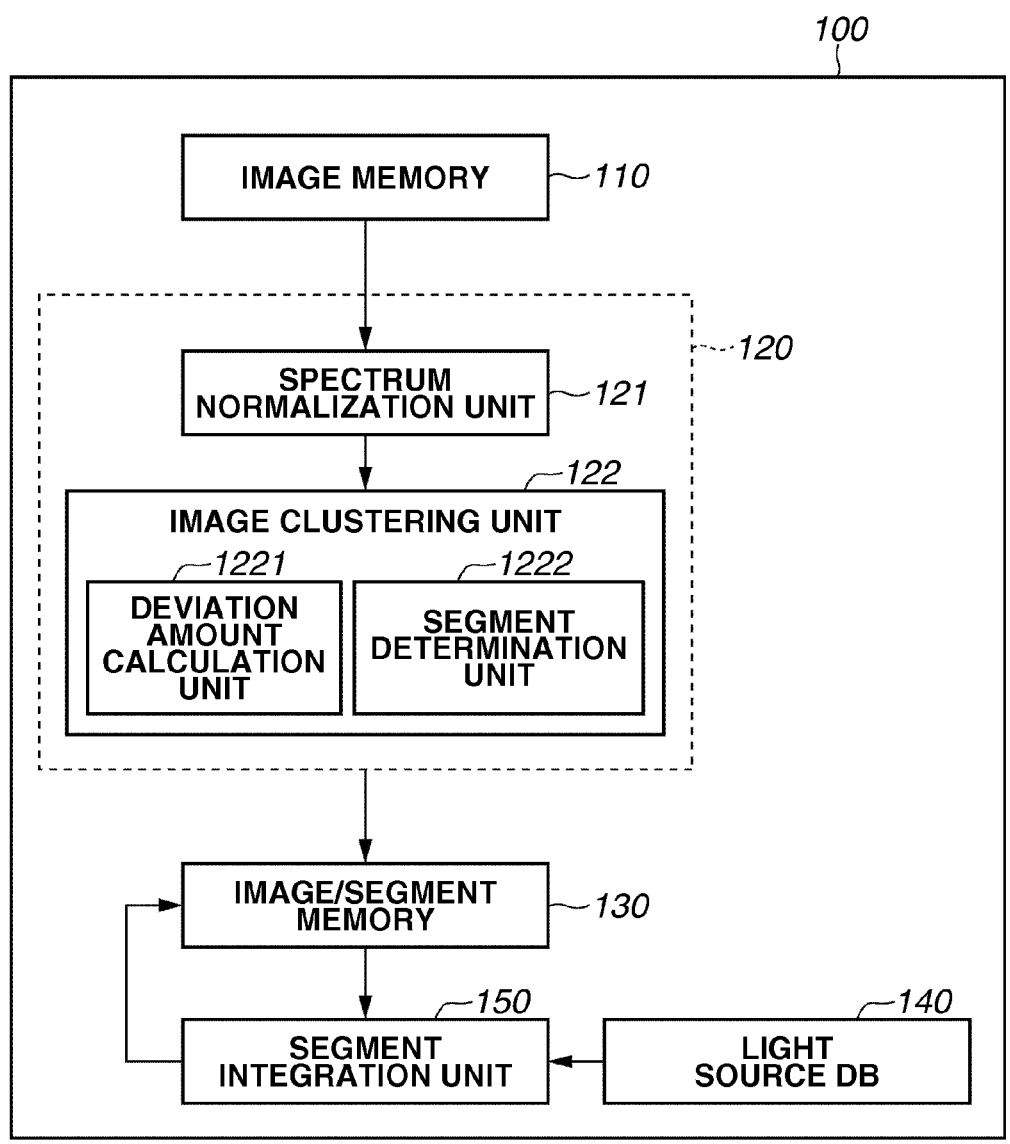
FIG. 1 is a block diagram illustrating an example of an inner configuration of an image processing apparatus.

FIG. 1 is a block diagram illustrating an example of an inner configuration of an image processing apparatus according to an exemplary embodiment of the present invention. As illustrated in FIG. 1, an image processing apparatus 100 includes an image memory 110, a spectral image data processing unit 120, an image/area memory 130, a light source data database (DB) 140, and an area integration unit 150.

The image memory 110 stores below-described image data (spectral image data of the object) output by a multiband camera that captures still images or moving images.

The spectral image data processing unit 120 processes the spectral image data stored in the image memory 110. The spectral image data processing unit 120 includes a spectrum normalization unit 121 and an image clustering unit 122.

The spectrum normalization unit 121 performs processing for normalizing the spectrum in each pixel of the spectral image data with respect to the luminance. The image clustering unit 122 performs image clustering processing of the spectral image data that was normalized by the spectrum normalization unit 121. The image clustering unit 122 includes a deviation amount calculation unit 1221 and a segment determination unit 1222.

The deviation amount calculation unit 1221 performs processing for calculating a deviation amount between the spectral data of a reference pixel and the spectral data of a target pixel to be clustered from among the pixels of the spectral image data. The spectral data has been normalized by the spectrum normalization unit 121.

The segment determination unit 1222 performs processing for determining an affiliated segment of the target pixel in the spectral image data object based on the deviation amount calculated by the deviation amount calculation unit 1221.

The image/segment memory 130 stores affiliated segment information of each pixel output from the image clustering unit 122 along with the image data (spectral image data).

The light source Data Base (DB) 140 configures a light source data storage unit that stores light source data (e.g., spectral radiance data) relating to the illumination light source of when imaging the object. The segment integration unit 150 performs processing for integrating each of the affiliated segments determined by the segment determination unit 1222, using the light source data stored in the light source DB 140.

Figure 2:
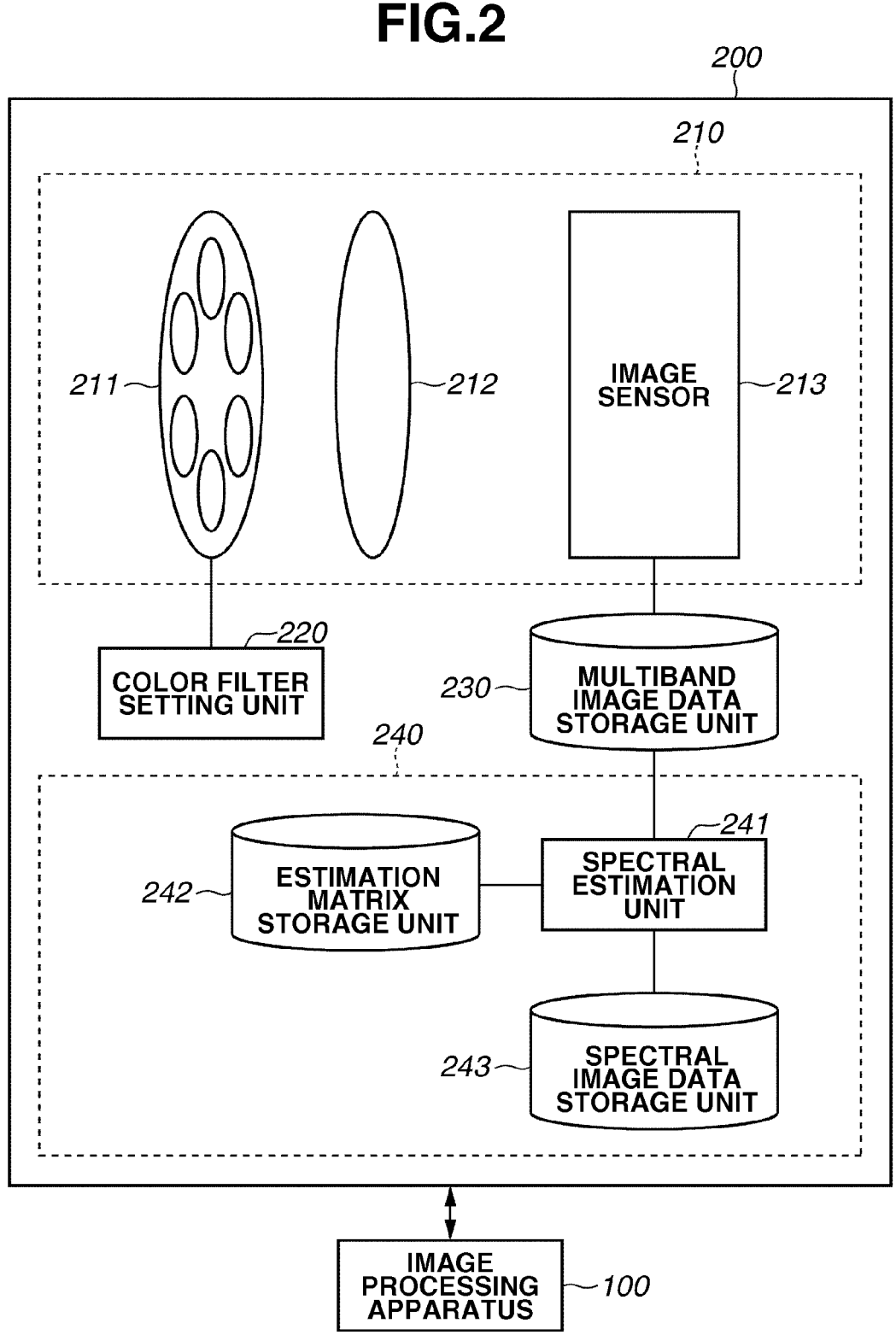
FIG. 2 is a block diagram illustrating an example of an image processing system including the image processing apparatus.

FIG. 2 is a block diagram illustrating an example of an image processing system including the image processing apparatus according to the exemplary embodiment of the present invention. The image processing system illustrated in FIG. 2 includes the image processing apparatus 100 illustrated in FIG. 1 and a multiband camera 200, which is connected to and capable of communicating with the image processing apparatus 100.

Specifically, FIG. 2 illustrates an example of the inner configuration of the multiband camera 200. This multiband camera 200 is an example of an apparatus for acquiring spectral image data in the image processing system illustrated in FIG. 2.

As illustrated in FIG. 2, the multiband camera 200 includes an imaging unit 210, a color filter setting unit 220, a multiband image data storage unit 230, and a spectral image conversion unit 240.

The imaging unit 210 includes a multiband color filter unit 211, a lens 212, and an image sensor 213. The imaging unit 210 photographs (captures) an object using the multiband color filter unit 211 set by the color filter setting unit 220. In the present exemplary embodiment, six bands are used. This band number is determined according to the number of color filters.

The multiband color filter unit 211 includes six color filters that can freely rotate or move and have different spectral transmission characteristics. Light incident on the multiband camera 200 from the object is transmitted through an arbitrary color filter.

The lens 212 forms an image of the incident light on the image sensor 213 via the multiband color filter 211. The image sensor 213 converts light from the object into an electrical signal (image signal). The image sensor 213 may be formed of a charge coupled device (CCD) or a complementary metal oxide semiconductor (CMOS).

The imaging unit 210 may be configured so as to form the image in one shot by forming the six-band color filter on a single image sensor 213, or form the image by forming three band color filters on each of two image sensors 213. In such cases, moving objects can also be captured in addition to still objects.

The color filter setting unit 220 sets all of the color filters respectively through which the light incident on the multiband color filter unit 211 is transmitted by controlling the multiband color filter unit 211.

The multiband image data storage unit 230 reads and stores the multiband image data captured by the image sensor 213.

The spectral image conversion unit 240 converts the multiband image data stored in the multiband image data storage unit 230 into spectral image data. This spectral image conversion unit 240 includes a spectral estimation unit 241, an estimation matrix storage unit 242, and a spectral image data storage unit 243.

The spectral estimation unit 241 performs spectral estimation for estimating the spectral data relating to spectral reflectance based on the multiband image data stored in the multiband image data storage unit 230. Based on the estimated spectral data, the spectral image data is generated.

The estimation matrix storage unit 242 stores an estimation matrix, which is required when performing the spectral estimation with the spectral estimation unit 241. The spectral image data storage unit 243 stores the spectral image data generated by the spectral estimation unit 241.

A known estimation method, for example, Wienner estimation, may be used for the spectral estimation performed by the spectral estimation unit 241. The estimation matrix converts the spectral information from six dimensions, which is the number of the color filters, into the dimension number of the spectral data. For example, the estimation matrix converts the spectral information of from 380 nm to 730 nm into 36 dimensions recorded per 10 nm. Based on the thus-acquired spectral image data, the image processing apparatus 100 according to the exemplary embodiment of the present invention performs image clustering of the image.

Figure 3:
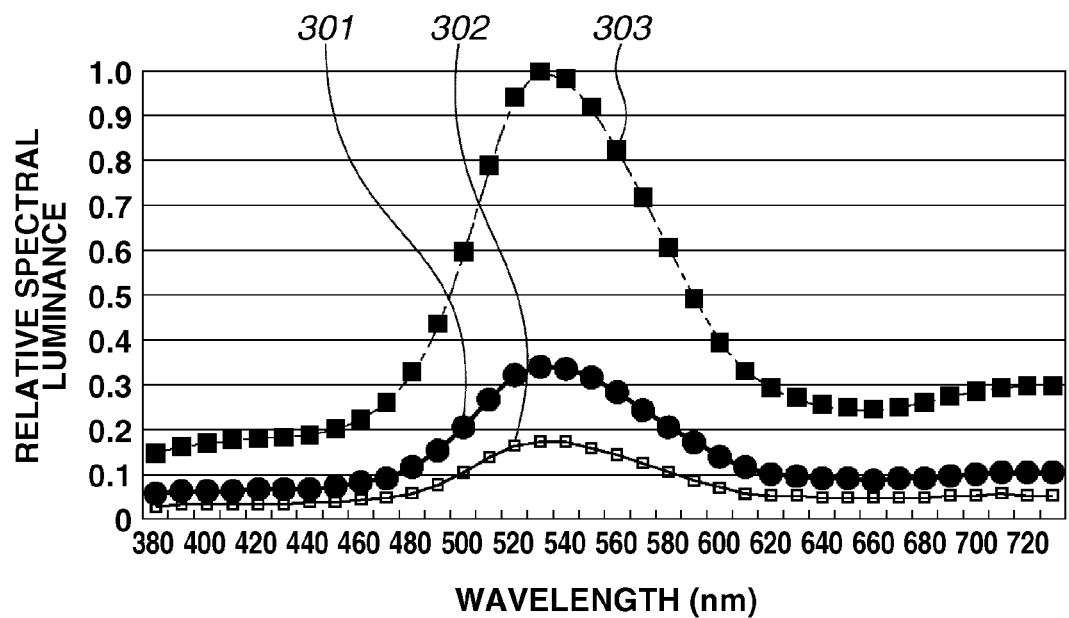
FIG. 3 is a graph illustrating an operation of a spectrum normalization unit illustrated in FIG. 1.

FIG. 3 is a graph illustrating an operation of the spectrum normalization unit 121 illustrated in FIG. 1. In FIG. 3, the vertical axis represents relative spectral luminance, and the horizontal axis represents wavelength (nm). The respective curves 301 to 303 have different spectral intensities.

In FIG. 3, the curves 301 and 302 represent the spectral data of pixels of the same object relating to the spectral image data. While these pixels have the same spectral reflectance, due to the shape of the object and the illumination conditions, the curve 301 is an area that is strongly illuminated, and the curve 302 is an area that is illuminated more weakly than line 301.

Thus, while these areas should be determined as being the same area when performing the image clustering of the spectral image data based on the spectral data, they show different characteristic shapes due to the intensity of illumination.

The curve 303 is spectral data obtained by normalizing the curves 301 and 302 by the spectrum normalization unit 121. The curve 303 illustrated in FIG. 3 is normalized so that the peak value of the spectral intensity is 1. However, any other methods can also be applied for the normalization method.

Thus, while the curves 301 and 302, which are not normalized, do not show equal spectral data, the curves 301 and 302 coincide with the curve 303 to show more equal spectral data with each other as a result of spectrum normalization.

Next, the operations performed by the image clustering unit 122 illustrated in FIG. 1 will be described. FIG. 4 is a flowchart illustrating an example of the operations that are performed by the image clustering unit 122 illustrated in FIG. 1.

First, in step S101, the image clustering unit 122 sets a pixel number i, which indicates the pixel on which segment determination is to be performed using the spectral data, to 1 (i.e., sets to be the first pixel), and starts the image clustering processing.

Next, in step S102, the image clustering unit 122 sets a reference pixel number p, which indicates a reference pixel of the spectral image data, to 1 (i.e., sets to be the first pixel), and sets a segment number n, which indicates the clustered segment, to 1.

In the following processing, for the first pixel of the spectral image data, the segment determination pixel and the reference pixel are the same, which means that the processing is a self-comparison. Therefore, in the following step S103, no deviation is produced in the calculation.

Further, in the subsequent steps S105 and S106, this first pixel is determined to be a first segment (n=1). Then, since the determination processing of all of the pixels is not finished (NO in step S108), the processing proceeds from step S108 to step S109.

In step S109, the target pixel is set to be a second pixel (i.e., pixel number is 2).

Next, in step S103, the image clustering unit 122 (deviation amount calculation unit 1221) calculates a deviation surface-area, which is the deviation amount between the spectral data of the target pixel (pixel with pixel number i) and the spectral data of a processed pixel (reference pixel with reference pixel number p). The deviation surface-area can be calculated using a root mean square (RMS) calculation illustrated in the following equation (1).

$$\text{RMS} = \frac{1}{N}\sqrt{\sum_{\lambda=380}^{730}(R_{ref}(\lambda) - R_{sam}(\lambda))^2} \qquad (1)$$

If the spectral data for the processed pixel (reference pixel with reference pixel number p) is $R_{ref}(\lambda)$, and the spectral data for the segment determination target pixel (pixel with pixel number i) is $R_{Sam}(\lambda)$, the RMS is expressed as in equation (1).

In equation (1), "N" is a sampling number. If the sampling is performed every 10 nm from 380 nm to 730 nm in the visible light region, then N=36. In step S103, simultaneously, the image clustering unit 122 (deviation amount calculation unit 1221) determines the sign of the difference in equation (1), that is, the difference between the spectral data of the reference pixel with the reference pixel number p and the spectral data of the pixel with the pixel number i of the segment determination target.

The magnitude of the deviation amount (deviation surface-area) calculated using RMS indicates how much the characteristic shapes of the spectral data match with each other. Therefore, when the deviation amount is sufficiently small, it can be determined that the compared pixels belong to the same segment.

Further, for equal deviation amounts, since it can be determined that a constant difference sign indicates that the characteristic shapes of the spectral data are better match, this sign can also be used in segment determination.

Figure 5A:
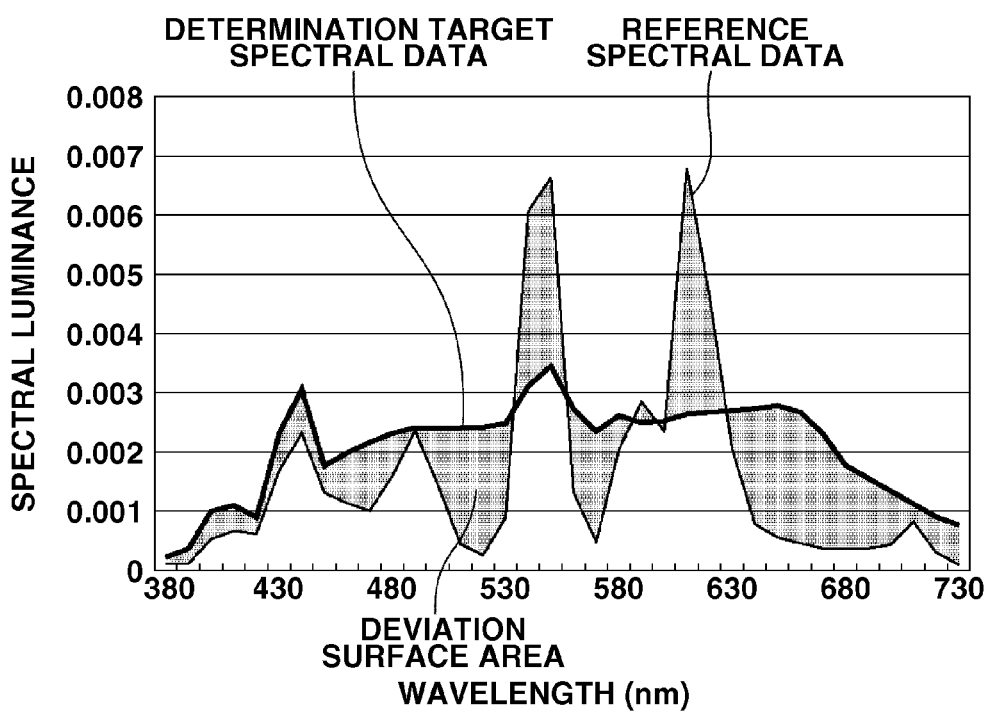
FIGS. 5A and 5B are graphs illustrating calculation processing of a deviation.
Figure 5B:
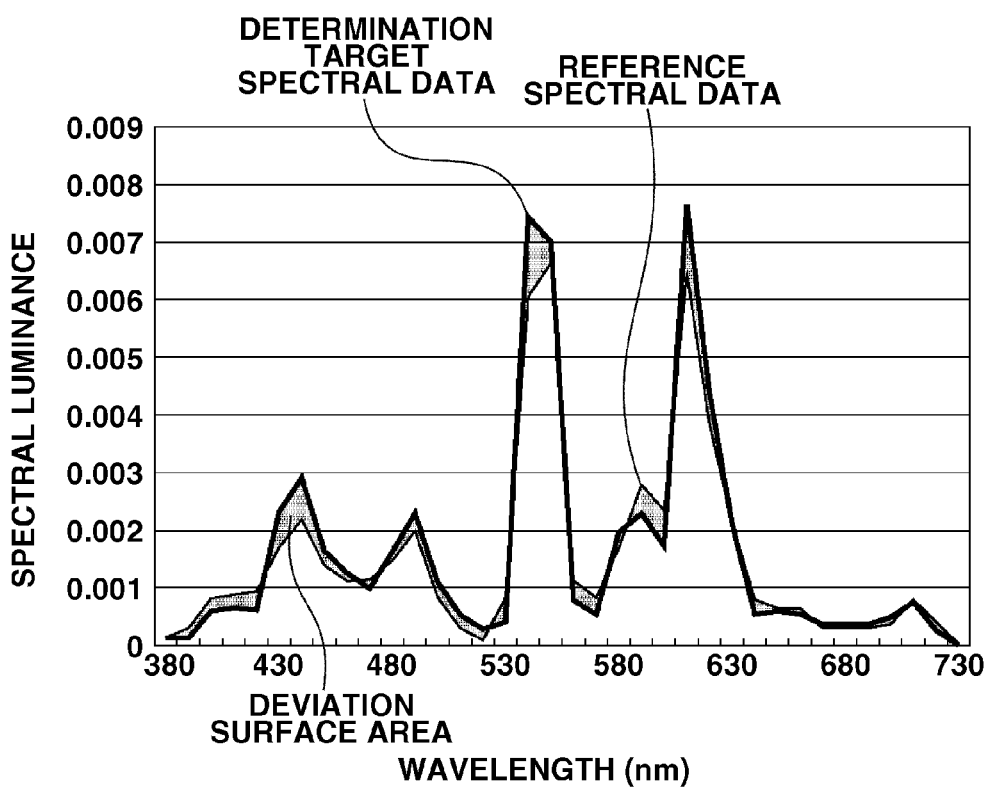

FIGS. 5A and 5B are graphs illustrating the processing for calculating the deviation surface-area in step S103 of FIG. 4. FIG. 5A illustrates a case where the deviation surface-area of the spectral data calculated using the RMS expressed by equation (1) is large, and FIG. 5B illustrates the same is small. In FIGS. 5A and 5B, the vertical axis represents spectral luminance, and the horizontal axis represents wavelength (nm)

In FIGS. 5A and 5B, the "determination target spectral data" represents the spectral data (i.e., $R_{Sam}(\lambda)$ of equation (1)) at the segment determination target pixel (pixel with pixel number i), and the "reference spectral data" represents the spectral data (i.e., $R_{ref}(\lambda)$ of equation (1)) at the processed pixel (reference pixel with reference pixel number p). Further, in FIGS. 5A and 5B, the portion indicated as the "deviation surface-area" corresponds to the area calculated using RMS expressed by equation (1).

The description will now return to FIG. 4. When the processing of step S103 is finished, in step S104, the image clustering unit 122 (e.g., the segment determination unit 1222) determines whether the deviation (difference) sign determined in step S103 has become a different sign.

If it is determined in step S104 that the deviation sign determined in step S103 is not a different sign (NO in step S104), the processing proceeds to step S105.

In step S105, the image clustering unit 122 (e.g., the segment determination unit 1222) compares the deviation surface-area calculated in step S103 with a preset first threshold Th1, and determines whether the deviation surface-area is smaller (less) than the first threshold Th1.

If it is determined in step S105 that the deviation surface-area is smaller than the first threshold Th1 (YES in step S105), the processing proceeds to step S107. On the other hand, if it is determined in step S105 that the deviation surface-area is not smaller than the first threshold Th1 (i.e., that the deviation surface-area is equal to or greater than the first threshold Th1) (NO in step S105), the processing proceeds to step S110.

Further, if it is determined in step S104 that the deviation sign determined in step S103 is a different sign (YES in step S104), the processing proceeds to step S106.

In step S106, the image clustering unit 122 (e.g., the segment determination unit 1222) compares the deviation surface-area calculated in step S103 with a preset second threshold Th2, and determines whether the deviation surface-area is smaller (less) than the second threshold Th2.

These steps S105 and S106 compare the deviation surface-area calculated in step S103 with a first threshold Th1 and a second threshold Th2 respectively, and determine whether the segment determination target pixel is the same segment as the reference pixel.

The first threshold Th1 in step S105, which is the threshold for when there was no inversion in the deviation sign, may be set to be greater than the second threshold Th2 in step S106, which is the threshold for when there was an inversion in the deviation sign.

If it is determined in step S106 that the deviation surface-area is smaller than the second threshold Th2 (YES in step S106), the processing proceeds to step S107. On the other hand, if it is determined in step S106 that the deviation surface-area is not smaller than the second threshold Th2 (i.e., that the deviation surface-area is equal to or greater than the second threshold Th2) (NO in step S106), the processing proceeds to step S110.

In step S107, the image clustering unit 122 (segment determination unit 1222) determines that the affiliated segment of the pixel with the pixel number i is the same segment as the affiliated segment of the reference pixel with the reference pixel number p.

Then, the image clustering 122 (segment determination unit 1222) gives to the pixel the pixel number i to a segment number n as affiliated segment information.

Next, in step S108, the image clustering unit 122 determines whether the processing of all of the pixels (i) of the spectral image data is finished.

If it is determined in step S108 that the processing of all of the pixels (i) is not finished (NO in step S108), the processing proceeds to step S109.

In step S109, the image clustering unit 122 adds 1 to the pixel number i indicating the target pixel to be clustered, and changes the target pixel to the next pixel. Then, the image clustering unit 122 again performs the processing subsequent to step S102 with setting the changed target pixel as the pixel number i.

On the other hand, if it is determined in step S108 that the processing of all of the pixels (i) is finished (YES in step S108), the processing illustrated in FIG. 4 is finished.

Further, if it is determined in step S105 or step S106 that the deviation surface-area is not smaller than the predetermined thresholds (NO in step S105 and S106), the processing proceeds to step S110. In step S110, the image clustering unit 122 (segment determination unit 1222) determines that the affiliated segment of the pixel with the pixel number i is a different segment to the affiliated segment of the reference pixel with the reference pixel number p.

Next, in step S111, the image clustering unit 122 determines whether the comparison processing of the pixel with the pixel number i has been performed for all of the reference pixels (p).

If it is determined in step S111 that the comparison processing of the pixel with the pixel number i not been performed for all of the reference pixels (p) (NO in step S111), the processing proceeds to step S112.

In step S112, the image clustering unit 122 adds 1 to the reference pixel number p indicating the reference pixel, and changes the reference pixel to the next reference pixel. Then, the image clustering unit 122 again performs the processing subsequent to step S103 with the changed reference pixel as the reference pixel number p.

On the other hand, if it is determined in step S111 that the comparison processing of the pixel with the pixel number i has been performed for all of the reference pixels (p) (YES in step S111), the processing proceeds to step S113.

In step S113, since the pixel with the pixel number i is not affiliated with any of the segment numbers (n) up to this point, the image clustering unit 122 gives to that pixel a segment number n+1 as affiliated segment information, and sets the pixel as a different segment. Then, the image clustering 122 performs the subsequent processing with n =n+1.

Next, in step S114, the image clustering unit 122 determines whether the processing of all of the pixels (i) is finished.

If it is determined in step S114 that the processing of all of the pixels (i) is not finished (NO in step S114), the processing proceeds to step S115.

In step S115, the image clustering 122 adds 1 to the pixel number i and changes the target pixel to the next pixel. Then, the image clustering unit 122 again performs the processing subsequent to step S102 with setting the changed target pixel as the pixel number i.

On the other hand, if it is determined in step S114 that the processing of all of the pixels (i) is finished (YES in step S114), the processing illustrated in FIG. 4 is finished.

Then, affiliated segment information of each pixel of the spectral image data output by the image clustering unit 122 is stored in the image/segment memory 130 along with the spectral image data.

Figure 6:
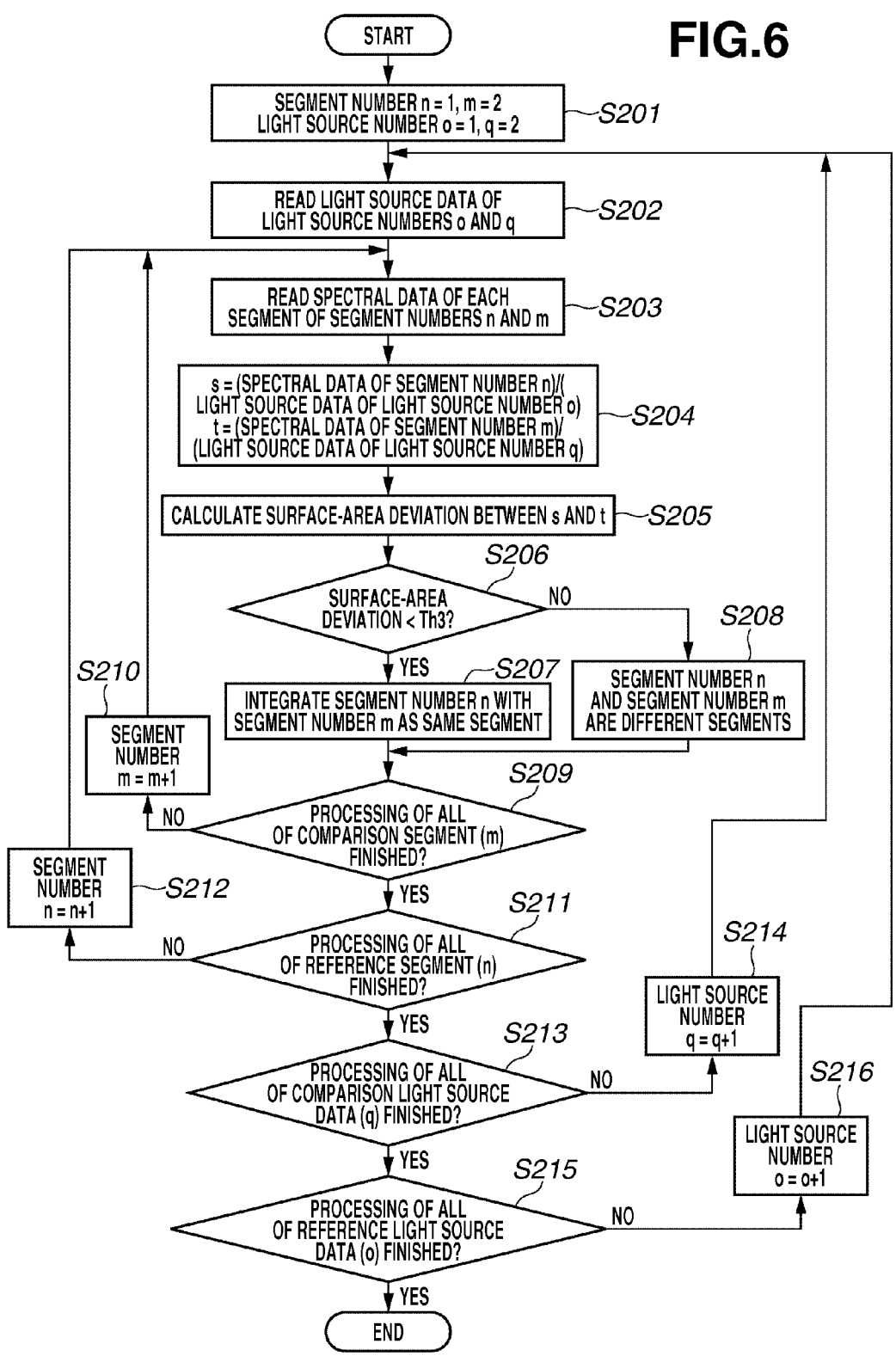
FIG. 6 is a flowchart illustrating an example of operations performed by an area integration unit illustrated in FIG. 1.

Next, the operations performed by the segment integration unit 150 illustrated in FIG. 1 will be described. FIG. 6 is a flowchart illustrating an example of the operations that are performed by the segment integration unit 150 illustrated in FIG. 1.

In the processing illustrated in FIG. 6, the spectral data of each clustered segment by the image clustering unit 122 of FIG. 1 is normalized based on the spectral data relating to the illumination light source stored in the light source DB 140 of FIG. 1. Then, the normalized spectral data is compared with each other, and the segments having a small difference in their normalized spectral data are reintegrated as the same segment.

First, in step S201, the segment integration unit 150 sets the reference segment number n, which indicates a reference segment, to 1, and sets the comparison segment number m, which indicates a comparison segment, to 2. Further, in step S201, the segment integration unit 150 sets the reference light source number o, which indicates reference light source data for performing normalization of the reference segment of the reference segment number n, to 1, and the comparison light source number q, which indicates comparison light source data for performing normalization of the comparison segment of the comparison segment number m, to 2.

In step S202, the segment integration unit 150 reads the spectral data (light source data) of the illumination light source in the reference light source number o and the comparison light source number q set in step S201 from the light source DB 140.

In step S203, the segment integration unit 150 reads the spectral data of the pixels for each segment in the reference segment number n and the comparison segment number m set in step S201 from the image/segment memory 130.

In step S204, the segment integration unit 150 calculates a division value s by dividing the spectral data of the reference segment of the reference segment number n read in step S203 by the spectral data (light source data) of the illumination light source of the reference light source number o read in step S202.

Further, the segment integration unit 150 calculates a division value t by dividing the spectral data of the comparison segment of the comparison segment number m read in step S203 by the spectral data (light source data) of the illumination light source of the comparison light source number q read in step S202.

This division value s and division value t are values obtained by normalizing the spectral data of each segment clustered by the image clustering unit 122 using the spectral data (light source data) relating to the illumination light source stored in the light source DB 140.

Next, in step S205, the segment integration unit 150 calculates the deviation surface-area, which is the deviation amount between the spectral data relating to the division value s and the spectral data relating to the division value t. This processing for calculating the deviation surface-area may be performed by using the processing performed in step S103 of FIG. 4, which is described above.

Next, in step S206, the segment integration unit 150 compares the deviation surface-area calculated in step S205 with a preset third threshold Th3, and determines whether the deviation surface-area is smaller (less) than the third threshold Th3.

If it is determined in step S206 that the deviation surface-area is smaller than the third threshold Th3 (YES in step S206), the processing proceeds to step S207.

In step S207, the segment integration unit 150 determines that the segment with the pixel number m and the segment with the pixel number n are the same segment, and performs integration processing of these segments.

On the other hand, if it is determined in step S206 that the deviation surface-area is not smaller than the third threshold Th3 (NO in step S206), the processing proceeds to step S208.

In step S208, the segment integration unit 150 determines that the segment with segment number m and the segment with segment number n are different segments, and does not perform integration processing.

When the processing of step S207 or step S208 is finished, the processing proceeds to step S209. In step S209, the segment integration unit 150 determines whether the processing of all of the comparison segments (m) is finished.

If it is determined in step S209 that the processing of all of the comparison segments (m) is not finished (NO in step S209), the processing proceeds to step S210.

In step S210, the segment integration unit 150 adds 1 to the comparison segment number m indicating the comparison segment, and changes the comparison segment to the next comparison segment. Then, the segment integration unit 150 again performs the processing subsequent to step S203 with setting the changed comparison segment as the comparison segment number m.

On the other hand, if it is determined in step S209 that the processing of all of the comparison segments (m) is finished (YES in step S209), the processing proceeds to step S211.

In step S211, the segment integration unit 150 determines whether the processing of all of the reference segments (n) is finished.

If it is determined in step S211 that the processing of all of the reference segments (n) is not finished (NO in step S211), the processing proceeds to step S212.

In step S212, the segment integration unit 150 adds 1 to the reference segment number n indicating the reference segment, and changes the reference segment to the next reference segment. Then, the segment integration unit 150 again performs the processing subsequent to step S203 with setting the changed reference segment as the reference segment number n.

On the other hand, if it is determined in step S211 that the processing of all of the reference segments (n) is finished (YES in step S211), the processing proceeds to step S213.

In step S213, the segment integration unit 150 determines whether the processing of all of the comparison light source data (q) is finished.

If it is determined in step S213 that the processing of all of the comparison light source data (q) is not finished (NO in step S213), the processing proceeds to step S214.

In step S214, the segment integration unit 150 adds 1 to the comparison light source number q indicating the comparison light source data, and changes the comparison light source data to the next piece of comparison light source data. Then, the segment integration unit 150 again performs the processing subsequent to step S202 with setting the changed comparison light source data as the comparison light source number q.

On the other hand, if it is determined in step S213 that the processing of all of the comparison light source data (q) is finished (YES in step S213), the processing proceeds to step S215.

In step S215, the segment integration unit 150 determines whether the processing of all of the reference light source data (o) is finished.

If it is determined in step S215 that the processing of all of the reference light source data (o) is not finished (NO in step S215), the processing proceeds to step S216.

In step S216, the segment integration unit 150 adds 1 to the reference light source number o indicating the reference light source data, and changes the reference light source data to the next piece of reference light source data. Then, the segment integration unit 150 again performs the processing subsequent to step S202 with setting the changed reference light source data as the reference light source number o.

On the other hand, if it is determined in step S215 that the processing of all of the reference light source data (o) is finished (YES in step S215), the processing illustrated in FIG. 6 is finished.

The processing performed by the respective structural units of the image processing apparatus 100 may also be applied to the spectral image data of either still images or moving images.

Figure 7:
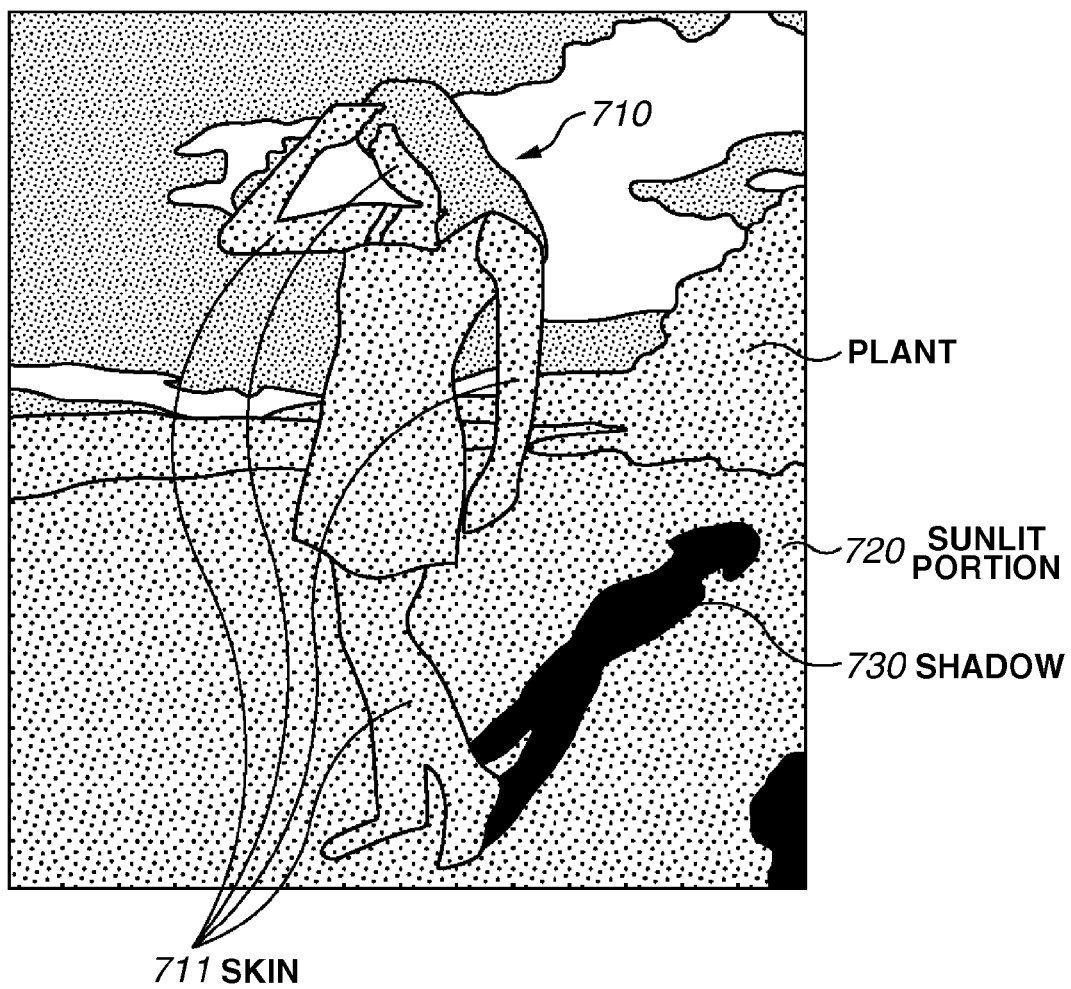
FIG. 7 illustrates an example of an image clustering result of an object in an image by the image processing apparatus.

FIG. 7 is a schematic diagram illustrating an example of an image clustering result of an object in an image by the image processing apparatus according to the present embodiment. In the present exemplary embodiment, the term "object" is not limited to a person, and is a collective term for objects that can serve as the segment determination target by the image clustering unit 122, including a background of the image.

FIG. 7 illustrates an image of a scene in which a person 710 is standing on a sunny beach shore. Under fine weather conditions, the same portions of the object, for example, a highlight portion and a shadow portion of the person's 710 skin 711, and a sunlit portion 720 and a shadow portion 730 of a sandy beach, have a large difference in luminance level. Moreover, sunlight is the main illumination light source for the sunlit portion, and skylight is the main illumination light source for the shadow portion.

Therefore, for image clustering processing based on spectral data of a simple object image, for example, the highlight portion and the shadow portion of the skin 711, and the sunlit portion 720 and shadow portion 730 of the sandy beach are not processed as the same segment.

In contrast, in the present exemplary embodiment, as described above, the image clustering processing is performed by removing the influence of the spectral data relating to the difference in the luminance level and the illumination light source. Therefore, the above-described portions can be processed as the same segment.

Namely, according to the present embodiment, during the processing of the spectral image data of the object, segments having a constant spectral reflectance can be accurately determined regardless of the state of the object. As a result, the spectral image data can appropriately undergo image clustering processing.

The respective structural units (respective devices) of FIG. 1, which configure the above-described image processing apparatus 100, and the respective steps of FIGS. 4 and 6, which illustrate the image processing method performed by the image processing apparatus 100, can be realized by executing a program stored on a central processing unit (CPU), random access memory (RAM), read only memory (ROM) and the like of a computer. This program and a computer-readable recording medium on which such a program is recorded are also included in the present invention.

Further, the present invention can also be embodied as a system, apparatus, method, program, storage medium, or the like. Specifically, the present invention may be applied in a system including a plurality of devices, or applied in an apparatus including a single device.

Aspects of the present invention also include supplying as a software program for realizing the functions of the image processing apparatus 100 according to the present embodiment (in the present exemplary embodiment, a program corresponding to the flowcharts illustrated in FIGS. 4 and 6) to a system or an apparatus either directly or remotely, and reading and executing the supplied program code by a computer of that system or apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2008-222461 filed Aug. 29, 2008, which is hereby incorporated by reference herein in its entirety.

What is claimed is:

1. An apparatus for processing spectral image data of an object, the apparatus comprising:

a first normalization unit configured to normalize spectral data of each pixel of the spectral image data with respect to luminance level, the luminance level being different for different areas formed on the object, wherein the spectral image data contains spectral data for each pixel representing an intensity corresponding to a wavelength;

an image clustering unit configured to determine, by using the spectral data normalized by the first normalization unit, which segment each pixel of the spectral image data belongs to based on a first deviation amount between the normalized spectral data of a reference pixel of the spectral image data and the normalized spectral data of a target pixel to be clustered thereof;

a second normalization unit configured to normalize spectral data of each of the segments determined by the image clustering unit, based on spectral data of light sources corresponding to each of the determined segments; and a segment integration unit configured to integrate the determined segments based on a second deviation amount of the spectral data normalized by the second normalization unit.

2. The apparatus according to claim 1, wherein the segment integration unit is configured to integrate determined comparison segments and a reference affiliated segment among the determined segments, when the second deviation amount between the comparison segment and the reference affiliated segment is smaller than a predetermined threshold, and not to integrate the comparison segment and the reference affiliated segment when the second deviation amount between the comparison segement and the reference affiliated segment is not smaller than the predetermined threshold.

3. The apparatus according to claim 1, wherein the image clustering unit is further configured to determine a sign of a difference between the normalized spectral data of the reference pixel and the normalized spectral data of the target pixel, and determine which segment each pixel of the spectral image data belongs to, based on the sigh of the difference and a comparison between the first deviation amount and a predetermined threshold, and wherein the image clustering unit is configured to use different predetermined thresholds based on whether the sign became a different sign when the determination of an affiliated segment is performed for each of the pixels.

4. The apparatus according to claim 1, further comprising a storage unit configured to store light source data relating to light sources at imaging the object.

5. The apparatus according to claim 4, wherein the light source data is spectral radiance data relating to the light sources.

6. The apparatus according to claim 1, wherein the first normalization unit normalizes the spectral data of each pixel of the spectral image data so that the spectral data has a peak intensity of 1, and wherein the second normalization unit normalizes the spectral data of each of the determined segments by being divided by the spectral data of the light sources corresponding to each of the determined segments.

7. The apparatus according to claim 1, wherein the image clustering unit determines which segment each pixel of the spectral image data belongs to, so that pixels having the first deviation amount smaller than the predetermined threshold belong to a same segment, and pixels having the first deviation amount not smaller than the predetermined threshold belong to different segments from each other.

8. A method for processing spectral image data of an object, the method comprising:

normalizing, by a processor, a spectral data of each pixel of the spectral image data with respect to luminance level, the luminance level being different for different areas formed on the object, wherein the spectral image data contains spectral data for each pixel representing an intensity corresponding to a wavelength;

determining, by the processor, by using the normalized spectral data, which segment each pixel of the spectral image data based on a first deviation amount between the normalized spectral data of a reference pixel of the spectral image data and the normalized spectral data of a target pixel to be clustered thereof;

normalizing, by the processor, spectral data of each of the determined segments, based on spectral data of light sources corresponding to each of the determined segments; and integrating, by the processor, the determined segments based on a second deviation amount of normalized spectral data of each of the determined segments.

9. The method according to claim 8, further comprising:

integrating a comparison segment and a reference affiliated segment among the determined segments when the second deviation amount between the comparison segment and the reference affiliated segment is smaller than a predetermined threshold, and not integrating the comparison segment and the reference affiliated segment when the second deviation amount between the comparison segment and the reference affiliated segment is not smaller than the predetermined threshold.

10. The method according to claim 8, further comprising:

determining a sign of a difference between the normalized spectral data of the reference pixel and the normalized spectral data of the target pixel;

determining which segment each pixel of the spectral image data belongs to, based on the sight of the difference and a comparison between the first deviation amount and a predetermined threshold; and using different predetermined thresholds based on whether the sign became a different sign when the determination of an affiliated segment is performed for each of the pixels.

11. The method according to claim 8, further comprising storing light source data relating to light source at imaging the object:

12. The method according to claim 11, wherein the light source data is spectral radiance data relating to the light source.

13. A non-transitory computer readable storage medium containing computer-executable instructions for causing a computer to execute a method for processing spectral image data of an object, the method comprising:

normalizing a spectral data of each pixel of the spectral image data with respect to luminance level, the luminance level being different for different areas formed on the object, wherein the spectral image data contains spectral data for each pixel representing an intensity corresponding to a wavelength;

determining, by using the normalized spectral data, which segment each pixel of the spectral data belongs to, based on a first deviation amount between the normalized spectral image data of a reference pixel of the spectral image data and the normalized spectral data of a target pixel to be clustered thereof;

normalizing spectral data of each of the determined segments, based on spectral data of light sources corresponding to each of the determined segments; and integrating the determined segments based on a second deviation amount of the normalized spectral data of each the determined segments.

14. The non-transitory computer readable storage medium according to claim 13, further comprising:

integrating a comparison segment and a reference affiliated segment among the determined segments, when the second deviation amount between the comparison segment and the reference affiliated segment is smaller than a predetermined threshold, and not integrating the comparison segment and the reference affiliated segment when the second deviation amount between the comparison segment and the reference affiliated segment is not smaller than the predetermined threshold.

15. The non-transitory computer readable storage medium according to claim 13, further comprising:

determining a sign of a difference between the normalized spectral data of the reference pixel and the normalized spectral data of the target pixel;

determining which segment each pixel of the spectral image data belongs to, based on the sigh of the difference and a comparison between the first deviation amount and a predetermined threshold; and using different predetermined threshold based on whether the sign became a different sign when the determination of an affiliated segment is performed for each of the pixels.

16. The non-transitory computer readable storage medium according to claim 13, further comprising:

storing light source data relating to light source at imaging the object

17. The non-transitory computer readable storage medium according to claim 16, wherein the light source data is spectral radiance data relating to the light sources.

* * * * *